US011270239B2

United States Patent
Neckowicz et al.

(10) Patent No.: US 11,270,239 B2
(45) Date of Patent: Mar. 8, 2022

(54) PROJECT PORTFOLIO MANAGEMENT SYSTEM CREATING VIRTUAL RELATIONSHIPS

(71) Applicant: InVizion LLC, Oak Ridge, TN (US)

(72) Inventors: Kristy Tan Neckowicz, Wynnewood, PA (US); Philip Dale Ramsey, Oak Ridge, TN (US); William R. Musick, Jr., Knoxville, TN (US); Matthew Cody Lambert, Lenoir City, TN (US); Philip Tyson Ramsey, Knoxville, TN (US)

(73) Assignee: INVIZION LLC, Oak Ridge, TN (US)

( * ) Notice: Subject to any disclaimer, the term of this patent is extended or adjusted under 35 U.S.C. 154(b) by 1048 days.

(21) Appl. No.: 14/725,763

(22) Filed: May 29, 2015

(65) Prior Publication Data

US 2016/0350698 A1 Dec. 1, 2016

(51) Int. Cl.
*G06Q 10/06* (2012.01)

(52) U.S. Cl.
CPC .......................... *G06Q 10/063118* (2013.01)

(58) Field of Classification Search
CPC ............................................ G06Q 10/063118
See application file for complete search history.

(56) References Cited

U.S. PATENT DOCUMENTS

| 7,305,392 | B1 * | 12/2007 | Abrams | ................. G06Q 10/06 707/770 |
| 8,400,467 | B1 * | 3/2013 | Ponce de Leon | ........................... G06Q 10/06316 345/619 |
| 2004/0098154 | A1 * | 5/2004 | McCarthy | ............... G06F 17/50 700/97 |
| 2008/0140485 | A1 * | 6/2008 | Williams | ............... G06Q 10/06 705/7.37 |

(Continued)

OTHER PUBLICATIONS

José Luis Ponz-Tienda et al, Fuzzy Project Scheduling Problem with Minimal Generalized Precedence Relations, Computer-Aided Civil and Intrastructure Engineering. 30(11):872-891 (Year: 2015).*

(Continued)

*Primary Examiner* — Andre D Boyce
(74) *Attorney, Agent, or Firm* — Patterson Intellectual Property Law, P.C.

(57) ABSTRACT

A project portfolio management system creating virtual interrelationships between projects. Aspects of the system include creating virtual relationships at the Work Breakdown Structure ("WBS") level with appropriate offsets using interpretations of logic relationships in detailed project schedules using various calculation approaches. The system models the linkages between detailed project schedules in a virtual relationship usable in alternate scenario planning analysis at a summary or working level. The virtual relationships are accurate enough for high level planning by users (e.g., program managers and analysts) with limited (Continued)

familiarity of project details (e.g., which non-workdays are in which project calendars) and reduce the computation times when altering a project planning scenario. Using the virtual relationships allows scenarios to be quickly evaluated to gauge the effects of changing constraints before committing to recalculating the detailed schedules of a project.

5 Claims, 8 Drawing Sheets

(56) References Cited

U.S. PATENT DOCUMENTS

| | | | |
|---|---|---|---|
| 2008/0195452 A1* | 8/2008 | Ponce de Leon | G06Q 10/06 705/7.12 |
| 2011/0071869 A1* | 3/2011 | O'Brien | G06Q 10/06 705/7.12 |
| 2013/0159198 A1* | 6/2013 | Cartan | G06Q 10/06 705/301 |
| 2014/0278819 A1* | 9/2014 | Ramsey | G06Q 10/06375 705/7.37 |
| 2014/0350985 A1* | 11/2014 | Pink | G06Q 10/063118 705/7.17 |
| 2016/0171406 A1* | 6/2016 | Sen | G06Q 10/06313 705/7.23 |
| 2016/0283875 A1* | 9/2016 | Birdi | G06Q 10/0635 |

OTHER PUBLICATIONS

Wuliang Peng et al, A critical chain project scheduling method based on a differential evolution algorithm, International Journal of Production Research, 2013, vol. 52, No. 13, 3940-3949 (Year: 2013).*

* cited by examiner

Fig. 3A

| Ordinal Month | 1 | 2 | 3 | 4 | 5 | 6 | 7 | 8 | 9 | 10 | 11 | 12 | 13 | 14 | 15 | 16 | 17 |
|---|---|---|---|---|---|---|---|---|---|---|---|---|---|---|---|---|---|
| | Aug. 2014 | Sep. 2014 | Oct. 2014 | Nov. 2014 | Dec. 2014 | Jan. 2015 | Feb. 2015 | Mar. 2015 | Apr. 2015 | May 2015 | Jun. 2015 | Jul. 2015 | Aug. 2015 | Sep. 2015 | Oct. 2015 | Nov. 2015 | Dec. 2015 |
| Period | 8/1-8/31 | 9/1-9/30 | 10/1-10/31 | 11/1-11/30 | 12/1-12/31 | 1/1-1/31 | 2/1-2/28 | 3/1-3/30 | 4/1-4/30 | 5/1-5/31 | 6/1-6/30 | 7/1-7/31 | 8/1-8/31 | 9/1-9/30 | 10/1-10/31 | 11/1-11/30 | 12/1-12/31 |

Fig. 3B

| Ordinal Quarter | 1 | 2 | 3 | 4 | 5 | 6 |
|---|---|---|---|---|---|---|
| | Q3 2014 | Q4 2014 | Q1 2015 | Q2 2015 | Q3 2015 | Q4 2015 |
| Period | 7/1/14-9/30/14 | 10/1/14-12/31/14 | 1/1/15-3/31/15 | 4/1/15-6/30/15 | 7/1/15-9/30/15 | 10/1/15-12/31/15 |

Fig. 3C

| Ordinal Fiscal Year | 1 | 2 | 3 |
|---|---|---|---|
| | FY 2014 | FY 2015 | FY 2016 |
| Period | 10/1/13-9/30/14 | 10/1/14-9/30/15 | 10/1/14-9/30/16 |

PROJECT PORTFOLIO MANAGEMENT SYSTEM CREATING VIRTUAL RELATIONSHIPS

BACKGROUND

On-site management of a project requires a significant level of detail to successfully manage the day-to-day execution. Proper planning and management involves breaking the project down into and monitoring execution of low level (e.g., day-to-day or hour-to-hour) activities to ensure the project remains on schedule and within budget. Each project has detailed schedules that contain the detail activities, resources, and workflows necessary for effective management.

Conventional project management tools used to plan and monitor projects include general purpose software applications (e.g., a spreadsheet application) facilitating management of small or simple projects, dedicated project management software applications facilitating management of small or simple projects to large or complex projects, and project portfolio management software suites (e.g., Primavera® P6® by Oracle®) facilitating management of small or simple projects to large or complex portfolios of large or complex projects. A large or complex project may have thousands of activities involving multiple resources (e.g., dollars, materials, engineers, or craft) each with their own project logic or workflow (i.e., relationships) and a portfolio may include tens to hundreds of projects.

Organizations managing projects and/or project portfolios frequently experience changing constraints that affect the planning and implementation of a portfolio, project, or portion thereof. Any project may have some level of interdependency with one or more other projects such that changing constraints (e.g., funding, manpower, limitations, craft, or timelines) may impact other projects. When adjustments to project constraints are made, the detailed schedules of the interdependent projects are evaluated and recalculated. In other words, changing project constraints in a large or complex project often requires recalculation of thousands of activities in view of the associated resources and relationships which is a time consuming process. If the altered project constraint causes the project to fall behind schedule and/or go over budget, finding a viable solution to bring the project back into compliance involves making one or more strategic modifications, each requiring additional recalculations of the project(s). Recalculating the detailed schedules is computationally intensive, and the time required to recalculate a project based on new constraints increases with the size and complexity of the detailed schedules.

It is with respect to these and other considerations that the present invention has been made.

BRIEF SUMMARY

The following summary describes aspects of a system and method for generating virtual relationships in a project portfolio management system. The system includes the virtual relationship component in communication with a project management system including project management data (e.g., a project portfolio management component) and an external and a database management component.

The virtual relationship component includes a logic relationship analyzer, a virtual offset calculator, a virtual relationship generator, and a scenario analyzer. The virtual relationship component uses the project planning scenario parameters to prepare project planning scenarios and alternate scenarios. The project planning scenario parameters include, without limitation, the planning horizon and the planning unit, and the calculation approaches used by the virtual relationship component. In various embodiments, the project planning scenario parameters are stored in the scenario data store. At the outset, the virtual relationship component divides the planning horizon into ordinal planning periods based on the planning unit.

The logic relationship analyzer analyzes the activity level project data and identifies a relationship type and calculates a lag for each logic relationship between tasks, activities or work elements in the detailed projects schedule of the project data.

The virtual offset calculator calculates offsets between key dates of a pair of related tasks linked by one of the logic relationships. The virtual offset calculator employs one or more of several calculation approaches that vary in computational intensity and precision. The system employs one or more calculation approaches allowing manipulation of planning scenarios to be optimized for speed or accuracy in accordance with the needs or desires of the user, including, but not limited to, an approximation approach, a rounding approach, and a precision approach.

For the precision and rounding approaches, the virtual relationship offset is generally calculated as the time/date difference between the key dates of the related activities plus the difference in the time/date differences of the intra-predecessor lag and the intra-successor lag between the related activities and their parent projects or parent tasks. The precision approach uses the actual temporal difference between the key dates to calculate the offset. The rounding approach calculates the offset using the ordinal numbers for the planning periods mapped to the key dates. Compared to the precision approach, mapping the key dates to ordinal planning periods prior to calculating the offset and using the corresponding ordinal planning period numbers results uses less computation time at the potential expense of reduced accuracy in some cases. For the approximation approach, the offset calculation is further simplified over the rounding approach by only finding the difference between the ordinal numbers for the planning periods mapped to the key dates for the parent tasks or parent projects.

The virtual relationship generator generates virtual relationships corresponding to the activity level relationships and links the related projects, sub-projects, work breakdown packages or parent tasks ("parent projects") using the virtual relationships. Each virtual relationship is based on the relationship type of the corresponding logic relationship and links the related projects, sub-projects, work breakdown packages or parent tasks ("parent projects") by the offset. The virtual relationships ensure that the earliest start or finish date of the successor projects, sub-projects, work breakdown packages or parent tasks ("parent projects") relative to the predecessor projects, sub-projects, work breakdown packages or parent tasks ("parent projects"), as defined by the logic relationship between the tasks, is honored.

The scenario analyzer generates alternate scenarios (i.e., moves the projects, sub-projects, work breakdown packages or parent tasks ("parent projects") relative to each other) for changing project constraints or changes made to a projects, sub-projects, work breakdown packages or parent tasks ("parent projects") (e.g., delaying or advancing projects, sub-projects, work breakdown packages or parent tasks ("parent projects")) using the virtual relationships linking the projects, sub-projects, work breakdown packages or parent tasks ("parent projects") and any other project constraints associated with the project planning scenario.

Other objects and advantages of the invention, besides those discussed here will be apparent to those of ordinary skill in the art from the description of the preferred embodiments which follows. In the description reference is made to the accompanying drawings, which form a part hereof, and which illustrate examples of the invention. Such examples, however, are not exhaustive of the various embodiments of the invention, and therefore reference is made to the claims which follow the description for determining the scope of the invention.

BRIEF DESCRIPTION OF THE DRAWINGS

Further features, aspects, and advantages of the present disclosure will become better understood by reference to the following figures, wherein elements are not to scale so as to more clearly show the details and wherein like reference numbers indicate like elements throughout the several views:

FIGS. 3A to 3C depict three different examples of planning scenario configurations;

DETAILED DESCRIPTION

A project portfolio management system creating virtual interrelationships between projects or parent tasks and accompanying method is described herein and illustrated in the accompanying figures. Aspects of the system include creating virtual relationships at the Work Breakdown Structure ("WBS") level with appropriate offsets using interpretations of logic relationships in detailed project schedules. The system models linkages between detailed project schedules as virtual relationships, which are usable in alternate scenario planning analysis at a summary or working level. The virtual relationships are accurate enough for high level planning by users (e.g., program managers and analysts) with limited familiarity of project details (e.g., which non-workdays are in which project calendars) and reduce the computation times when altering a project planning scenario. Using the virtual relationships allows scenarios to be quickly evaluated to gauge the effects of changing constraints before committing to recalculating the detailed schedules of a project.

Figure 1:
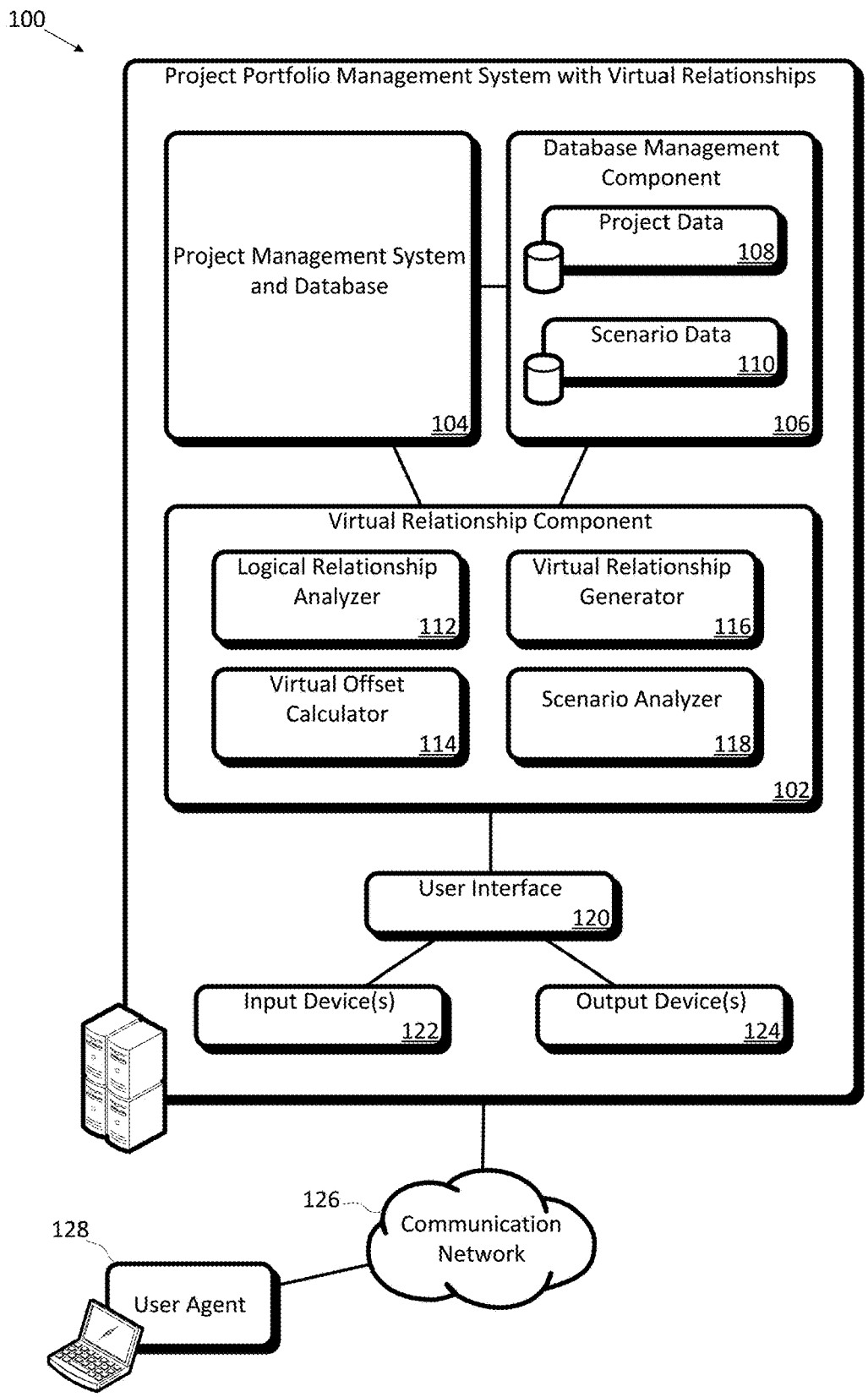
FIG. 1 is a simplified block diagram illustrating various aspects of the system.

FIG. 1 is a simplified block diagram illustrating aspects of the project management system with virtual relationships in a typical operating environment. The system 100 includes the virtual relationship component 102 running on a suitable computing device, such as an application server. The virtual relationship component 102 is in communication with a project management system including project management data 104 (e.g., a project portfolio management component) running on a suitable computing device, such as an application server, and an external and a database management component 106 running on a suitable computing device, such as a data server.

The database management component 106 maintains various data stores including, but not limited to, a project data store 108 and scenario data store 110. In various embodiments, the project data store 108 may contain, but is not limited to, one or more of static reference data, imported project management information obtained from the external project management tool. Scenarios generated with the system are stored in the scenario data store 110. The scenario data store 110 holds information such as project planning scenarios.

The virtual relationship component 102 includes a logic relationship analyzer 112, a virtual offset calculator 114, a virtual relationship generator 116, and a scenario analyzer 118. The virtual relationship component 102 uses the project planning scenario parameters to prepare project planning scenarios, the virtual relationships and alternate scenarios generated using the virtual relationships. The project planning scenario parameters include, without limitation, the planning horizon and the planning unit, and the calculation approaches used by the virtual relationship component 102. In various embodiments, the project planning scenario parameters are stored in the scenario data store 110. At the outset, the virtual relationship component 102 divides the planning horizon into ordinal planning periods based on the planning unit.

The logic relationship analyzer 112 analyzes the activity level project data and identifies a relationship type and calculates a lag for each logic relationship between tasks, activities, work elements or work packages ("tasks") in the detailed project schedule of the project data. A detailed project schedule for a project handled by the project portfolio management system often contain large amounts of data used to model the amount and sequence of work needed to execute one or more projects and to manage the outcome of the project. More specifically, the detailed project schedule includes all of the tasks that must be performed in order to achieve the desired outcome, the resources allocated for each task, and the logic relationships between the tasks. Each task may have a logic relationship with one or more other tasks. Examples of logic relationships include, but are not limited to, finish-to-start, start-to-start, start-to-finish, finish-to-finish relationships.

Generally, certain groups of users of a project portfolio management system, such as program managers and executives, are primarily interested the analyzing the impact of delays or accelerations on a project at a very high level (e.g., only the top two or three levels in the task hierarchy) and often have need to make multiple adjustments to the project within a short period of time in order to evaluate which of the resulting alternate scenarios is most suitable. However, in order to generate an alternate scenario, the start and finish dates of each task in the project must be recalculated each time the start or finish date of a single activity is adjusted. When a large number of tasks and logic relationships are involved, generating alternate scenarios is prohibitively time consuming.

As used herein, a task generally refers to any work entity in the project data, such as, but not limited to a project or activity. A project generally includes a number of subordinate activities. Typically, a project is used to refer to an entity at the highest hierarchical level in the project data. Activities may be made up of various sub-activities arranged at still lower hierarchical levels.

Given this context, the present application describes the entities in terms of activities and projects, such terms are considered convenient nomenclature to differentiate between tasks at different hierarchical levels and are not intended to limit the scope of the system and method. As such, a project is intended to broadly encompass any entity that contains a number of subordinate entities regardless of hierarchical level (e.g., a work package or an activity made up of a number of sub-activities). In other words, references to a project and its activities are intended to encompass a work element having a number of sub-elements.

The virtual offset calculator 114 calculates offsets between key dates of a pair of related tasks linked by one of the logic relationships. The virtual offset calculator 114 employs one or more of several calculation approaches that vary in computational intensity and precision. The different calculation approaches allows calculation of offsets between the related tasks to be optimized for the desired level of speed balanced against potential reductions in accuracy. For example, the lesser computationally intense calculation approaches may be used for quick evaluation of multiple alternate scenarios to find the n-best alternate scenarios, and the more computationally intense calculation approaches may be used to further refine the n-best alternate scenarios. Regardless of the calculation approach used, the resulting offsets are generally accurate enough to produce alternate scenarios suitable for high level analysis by a user. Moreover, any of the calculation approaches allow alternate scenarios to be generated significantly faster than is achievable using the existing logic relationships.

The virtual relationship generator 116 generates virtual relationships corresponding to the activity or task level relationships and links the related parent tasks using the virtual relationships. Each virtual relationship is based on the relationship type of the corresponding logic relationship and links the key dates of the related parent tasks by the offset. The virtual relationships ensure that the earliest start or finish date of the successor task relative to the predecessor task, relative to the logic relationship between the tasks, is honored. In various embodiments, the virtual relationships are stored with the original project data in the project data store 108 or in the scenario data in the scenario data store 110.

The scenario analyzer 118 generates alternate scenarios (i.e., moves the tasks relative to each other) for changing project constraints or changes made to a task (e.g., delaying or advancing a project or work package) using the virtual relationships linking the tasks and any other project constraints associated with the project planning scenario. The system models the linkages between detailed project schedules in a virtual relationship usable in alternate scenario planning analysis at a summary or working level.

The system 100 includes a user interface 120 that allows users to interact with the components of system 100 via one or more input devices 122 (e.g., a keyboard, mouse, touch screen, or microphone) and one or more output devices 124 (e.g., video displays, printers, and speakers). The input devices 122 and output devices 124 may be local or remote. In various embodiments, the user interface 120 includes one or more interface types including, but not limited to, menu, form, point-and-click, drag-and-drop, touch, gesture, voice recognition, and natural user interfaces.

In various embodiments, users access the system 100, the virtual relationship component 102, the project management system including project management data 104, and/or the database management component 106 over a network 126 (e.g., personal area networks, local area networks, wide area networks, the Internet, or combinations thereof) via a user agent component 128 running on a suitable client computing device, such as a laptop computer, a tablet or a mobile computing device. In various embodiments, the user agent component 128 displays the user interface 120. For example, the user interface 120 may be implemented via hypertext markup language (HTML) or extensible markup language (XML) documents displayable by the user agent component 128 operating as a terminal allowing a general purpose computing device, such as a laptop or smartphone to be specifically utilized as part of the system. Alternatively, the user interface 120 may be provided by a dedicated client application acting as the user agent component 128.

Some or all of the virtual relationship component 102, the project management system including project management data 104, and the database management component 106 may be implemented in a single device or as distributed components in communication via the network 126.

Figure 2:
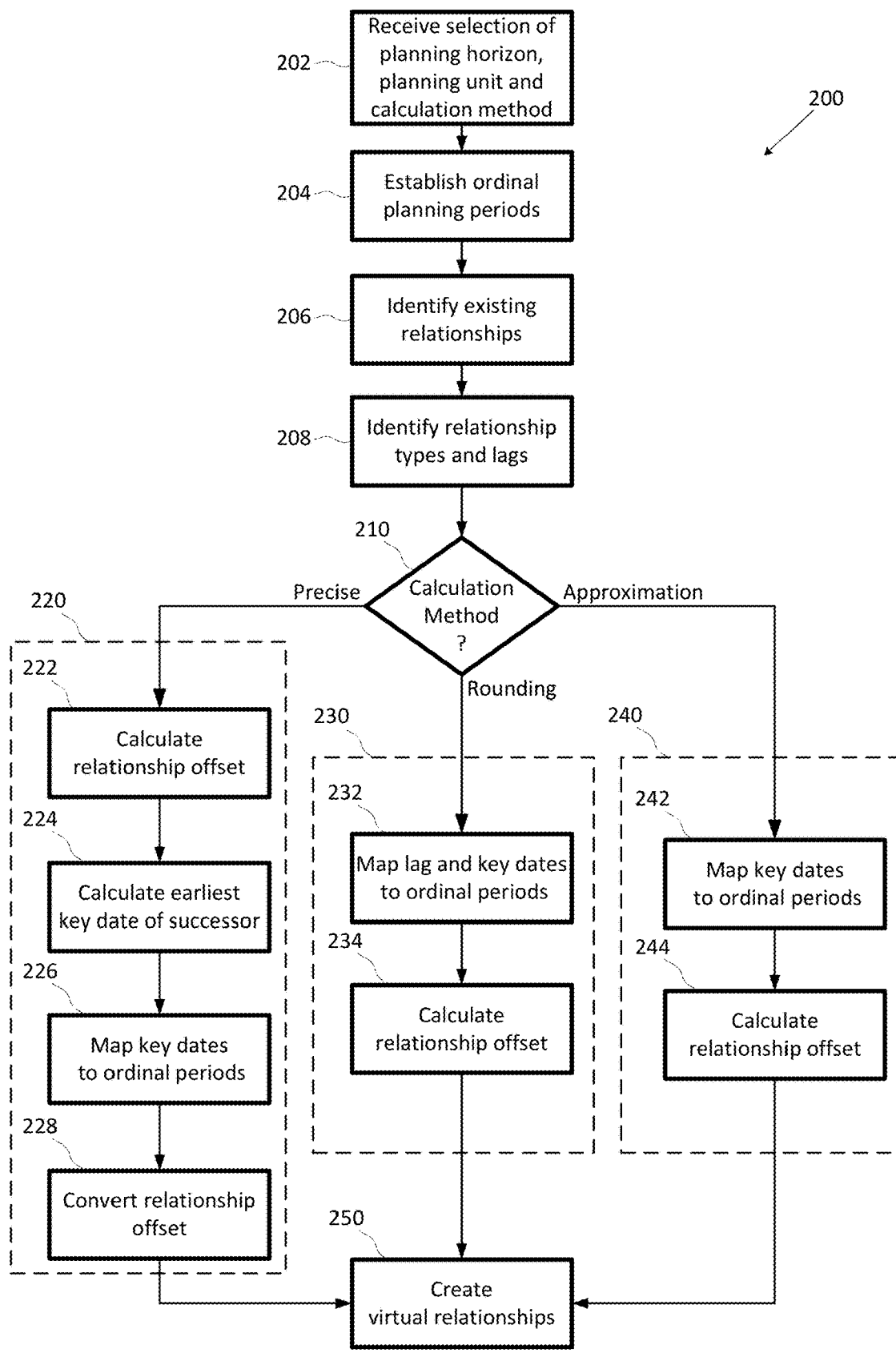
FIG. 2 is a high level flowchart illustrating aspects of the method for building virtual relationships from the task, activity, work element or work package level into a link at the parent task or parent project level for a selected project planning scenario, as performed by the system.

FIG. 2 is a high level flowchart illustrating aspects of the method for building virtual relationships at a WBS or project level for a selected project planning scenario, as performed by the system. The method 200 begins with a configuration operation 202. In the configuration operation 202, the system receives parameters to use when generating a planning scenario based on the project schedule. The parameters include the selection of a planning horizon, a planning unit, and a calculation approach. The planning horizon corresponds to the total span of time to be covered by the system-generated planning scenario. The planning horizon is commonly expressed in terms of calendar fiscal units (e.g., years, months, or days). The planning unit corresponds to the measurement increment used to divide the planning horizon for when generating the planning scenario. The planning unit is commonly expressed in terms of calendar units or fiscal units. Examples of suitable planning units include, without limitation, years (calendar or fiscal), quarters, months, hours, shifts, and days.

One aspect of the system is the ability to account for non-workdays when calculating the virtual relationship offset. In some cases, the virtual relationship offset may be meaningfully skewed as a result of non-workdays in the detailed project calendar. For example, one project period (e.g., a month) may include an unusually higher number of non-workdays than other project periods. Rather than using the number of calendar days, the system optionally uses the number of workdays to provide greater accuracy when calculating the virtual relationship offset.

The calculation approach influences the time required to generate the offsets for the WBS virtual relationships used by the system for alternate scenario planning, as well as the accuracy and/or precision of the resulting planning scenarios. The system employs one or more calculation approaches allowing manipulation of planning scenarios to be optimized for speed or accuracy in accordance with the needs or desires of the user. The calculation approaches employed by the system include, but are not limited to, an approximation approach, a rounding approach, and a precision approach.

Optional aspects of the system include the ability to select a single calculation approach to use for all virtual relationship offset calculations made by the system or a combination of calculation approaches to be applied to particular virtual relationship offset calculations. For example, in some embodiments, the user interface of the system allows users to configure a single calculation approach to use for all relationships. In other embodiments, the user interface of the system allows users to configure to set the default calculation approach and to set separate calculation approaches to override the default calculation approach for some or all relationships on an individual basis. Alternatively, various embodiments of the system may have a default setting that allows the system administrator to set the calculation approach, in which case the user would only configure a calculation approach for an individual activity level relationship if desiring to override the default calculation approach.

In an ordinal period creation operation 204, the system divides the planning horizon into ordinal periods based on the configured planning unit. The ordinal periods ensure the projects are placed in the correct period.

In a relationship detection operation 206, the system identifies the existing logic relationships between predecessor and successor tasks or activities ("activities") in the detail project management information regardless of the WBS-level task.

In a relationship classification operation 208, the system identifies the relationship types and, optionally, calculates the temporal difference between each pair of predecessor and successor activities linked by a logic relationship in the detail project management information. The relationship type indicates the key dates of the predecessor and successor projects that are linked by the relationship. In various embodiments, the system determines the relationship type by identifying the type of key date (i.e., the start date or finish date) of the predecessor activity linked by the relationship and the type of key date of the successor activity linked by the relationship.

The temporal difference is the difference between the related key dates of the activities involved in the relationship. The temporal difference has a direction expressed in terms of lag time or lead time (i.e., reverse lag time). For convenience, the temporal difference is referred to herein as lag and the temporal difference for future dates (i.e., lag time) is a positive value and for prior dates is a negative value (i.e., lead time). It should be appreciated that the system may optionally or selectively handle time difference in terms of lead time by design or based on user preference. In various embodiments, the temporal difference, $t_{lag}$, is calculated as:

$$t_{lag} = \text{TDIFF}(\text{Key}_s, \text{Key}_p, r), \quad (1)$$

where TDIFF is a time/date difference function, $\text{Key}_s$ and $\text{Key}_p$ are the respective key dates of the successor and predecessor activities, and r is an expression of the relationship type between the key dates. When calculating $t_{lag}$ for a start-to-start or finish-to-finish relationship, the calculation inherently includes the entire date range without counting the end date. In other words, only one of the start or finish dates is counted when calculating the lag. On the other hand, when calculating the lag for a mixed key date relationship type (i.e., using different key date types for the different linked activities), such as a start-to-finish or finish-to-start relationship, the end date is counted to provide for accurate calculation of the earliest start or finish date, which allows for proper mapping of the earliest start or finish date to the appropriate ordinal planning period.

Accordingly, in some embodiments, r represents a flag or other indicator specifying whether to include the end date in date difference calculation based on a pre-calculation evaluation of the relationship type. In other embodiments, r represents an enumeration of the relationship type that is understood by the TDIFF function and used to determine whether to include the end date in date difference calculation. In some embodiments, r is omitted and an appropriate adjustment, if necessary, is made to the base date difference calculation (with or without the end date) is made based on a post-calculation evaluation of the relationship type.

An aspect of the system is the ability to select default units of time difference (e.g., years, weeks, days, hours, minutes, shifts, etc.) based on the particular scenario or configured user preferences. For example, the system default unit of time difference may be days when using planning units of months, or other large granularity planning units and hours when using smaller granularity planning units, such as weeks or days. However, the system default unit of time difference may be selectively overridden by a user selection. For example, a user may configure the system to use hours as the unit of time difference even when using planning units of months or years.

In a calculation approach decision 210, the system determines which calculation approach to use to calculate the virtual offset for each activity level relationship and branches to a pipeline for the appropriate calculation approach. In the illustrated embodiment, the calculation approach decision 210 routes to a precision approach pipeline 220, a rounding approach pipeline 230, and an approximation approach pipeline 240. The calculation approach pipelines 220, 230, 240 calculate the virtual relationship offset for the activity level relationships. The offset is then used to generate the virtual relationship work elements at any higher level of detailed desired, such as WBS elements or projects.

As previously mentioned, the same calculation approach may be configured for all activity level relationships, specific calculation approaches may be configured for selected activity level relationships with a default calculation approach being used for any activity level relationship not specifically configured, or a selected calculation approach may be configured for each activity level relationship in the detailed project information.

Before discussing the different calculation approaches, it is instructive to compare how the virtual relationship offset is calculated in each approach. For the precision and rounding approaches, the virtual relationship offset, $t_{offset}$, is generally calculated as the time/date difference between the key dates of the related activities plus the difference in the time/date differences of the intra-predecessor lag and the intra-successor lag between the related activities and their parent work elements such as WBS elements or projects.

For the precision approach, the offset is calculated, using the time/date difference between the key dates, as follows:

$$t_{offset} = t_{lag} + \{\text{TDIFF}(\text{Key}_p - \text{Key}_X) - \text{TDIFF}(\text{Key}_s - \text{Key}_Y)\} + d, \quad (2)$$

where $\text{Key}_X$ and $\text{Key}_Y$ are the respective key dates of the parent projects, tasks or work elements corresponding to the successor and predecessor activities, and d is a correction factor. When the scenario planning period is in days, the correction factor, d, is used to adjust the offset by ±1 day in cases where a mixed key date relationship type exists between the related activities. The sign of the correction factor is the opposite of the sign of the temporal difference. In other words, when the lag is a positive value, the value of d is −1 day and, when the lag is a negative value (i.e., lead time), the value of d is +1 day. When a same key date relationship type exists or the scenario planning period uses planning units larger than days, no correction is needed and the value of d is 0.

For the rounding approach, the offset is calculated similarly to the precision approach, but using the ordinal numbers for the planning periods mapped to the key dates, as follows:

$$t_{offset} = t_{lag} + \{(N_{Key_p} - N_{Key_X}) - (N_{Key_s} - N_{Key_Y})\}, \quad (3)$$

where $N_{Key_s}$ and $N_{Key_p}$ are the respective ordinal numbers corresponding to the ordinal periods of key dates of the successor and predecessor activities within the planning horizon and $N_{Key_X}$ and $N_{Key_Y}$ are the respective ordinal numbers corresponding to the ordinal periods of the key dates of the corresponding successor and predecessor parent projects, tasks or work elements within the planning horizon. The mapping operations and the resulting ordinal value calculations are less computationally intensive than the date difference calculations performed by the system in the precision approach. Compared to the precision approach, mapping the key dates to ordinal planning periods prior to calculating the offset and using the corresponding ordinal planning period numbers results uses less computation time at the potential expense of reduced accuracy in some cases.

In Equation 3, $t_{lag}$ is converted to planning units. In various embodiments, $t_{lag}$ is converted into planning units using ordinal planning period numbers, i.e., $t_{lag} = (N_{Key_s} - N_{Key_p})$ when calculating $t_{offset}$ in the rounding approach. Alternatively, $t_{lag}$ is converted by applying an appropriate conversion factor to obtain the value of $t_{lag}$ in planning units. For example, to convert $t_{lag}$ expressed in days to months, the system may divide $t_{lag}$ by 30 days/month. Fractional results may be converted to whole numbers using various functions producing integer values (e.g., integer, rounding, ceiling, floor, etc.) either at the time of conversion or when the final offset is calculated. Further, in various embodiments, the system may initially use the simplified $t_{lag}$ based on ordinal planning period numbers in place of Equation 1 in scenarios using the rounding or approximation approaches or other instances when greater precision is not desired or required.

For the approximation approach, the offset calculation is further simplified over the rounding approach by only finding the difference between the ordinal numbers for the planning periods mapped to the key dates for the parent tasks, work elements or projects, as follows:

$$t_{offset} = (N_{Key_Y} - N_{Key_X}). \quad (4)$$

In other words, the approximation approach ignores the effect of temporal differences at the activity level in favor of simple, rapid calculations to minimize processing time compared to using the precision or rounding approaches at the potential expense of reduced accuracy in some cases.

When using the approximation or rounding approaches, larger (i.e., less granular) planning units produce less accurate offset calculations because temporal differences that are fractions of the selected planning unit are converted to the next larger whole planning unit. For example, when using a yearly planning period, a period of two months becomes one year and a period of 13 months becomes two years. The precision approach typically provides greater accuracy in the resulting planning scenario, at the expense of longer planning scenario generation times.

If the system determines that the precision approach is configured for the activity level logic relationship, the calculation approach decision 210 branches to the precision approach pipeline 220, which performs the underlying offset calculations in a selected temporal unit and converts the results into planning periods to obtain the virtual offset.

The precision approach pipeline 220 begins with a precision offset calculation operation 222, the system calculates an offset for the virtual relationship using Equation 2 for the current activity level logic relationship being processed. Once the offset has been calculated, a successor date calculation operation 224 is performed by the system to calculate the earliest successor key date by adding $t_{lag}$ to the appropriate predecessor key date for the current activity level logic relationship.

After calculating the offset, a key date mapping operation 226 maps the key date of the predecessor parent project, task or work element and the calculated earliest key date for the successor parent project, task or work element to the corresponding ordinal planning periods. Finally, in a conversion operation 228, the system converts the virtual offset into planning periods by calculating the difference between the ordinal period numbers corresponding to the key date of the predecessor parent project, task or work element and the calculated earliest key date for the successor parent project, task or work element.

If the system determines that the rounding approach has been configured at calculation approach decision 210, the system initiates a rounding approach pipeline 230, which uses the ordinal planning periods for the relevant activity level dates for the activities and parent projects, tasks or work elements when calculating the virtual offset. The rounding approach pipeline 230 begins with a key date mapping operation 232 where the system maps the key dates of the predecessor and successor parent projects, tasks or work elements and activities of the relationship being analyzed to the corresponding ordinal planning periods.

Next, in a rounding offset calculation operation 234, the system calculates an offset for the virtual relationship using the mapped ordinal planning period numbers in Equation 3 for the current activity level logic relationship being processed.

If the system determines that the approximation approach has been selected at calculation approach decision 210, the system initiates an approximation approach pipeline 240, which uses the ordinal planning periods for the parent project when calculating the virtual offset. The approximation approach pipeline 240 begins with a key date mapping operation 242 where the system maps the key dates of the predecessor and successor parent projects of the activities in the relationship being analyzed to the corresponding ordinal planning periods.

Next, in an approximation offset calculation operation 244, the system calculates an offset for the virtual relationship using the mapped ordinal planning period numbers in Equation 4 for the current activity level logic relationship being processed.

The operations of the calculation approach pipelines 220, 230, 240 are generally repeated for each relevant logical relationship between activities or tasks in the detailed project information; however, the sequence of operations may be varied to optimize the performance of the system.

Once the offset for the relationship between the related projects has been calculated using the appropriate calculation approach pipeline 220, 230, 240, a virtual relationship generation operation 250 creates and stores a new virtual relationship between the predecessor and successor parent work elements, WBS element or projects using the same relationship type as the activity level relationship with the calculated virtual offset.

These relationship offset calculations determine the earliest or latest start/finish periods for succeeding projects. The virtual relationships created by the system ensure that succeeding projects are not unnecessarily delayed when the preceding projects are delayed. The virtual relationships also ensure that offsets are honored and succeeding projects accelerated when a preceding project is accelerated. The virtual relationships are accurate enough to properly delay or accelerate a succeeding project when the preceding project is delayed or accelerated and allow the system to rapidly calculate the effect of adjustments made to the detailed project information while reducing the number or complexity of the computations involved. Accordingly, the virtual relationships effectively reduce power consumption when evaluating alternate scenarios.

However, there may be legitimate reasons why the succeeding projects or work elements may not start or finish at a particular time, so another aspect of the system is the use of optional date constraints to model these types of planning scenarios. When a project's or work element's current schedule starts or finishes later than the system's calculated early period due to some other project constraint not accounted for by the virtual relationship, the user interface of the system allows creation of scenarios that override these other project constraints and start successor projects or work elements as soon as possible after the system-calculated earliest start date while honoring all other virtual relationships.

As mentioned above, the virtual relationship is based on the primary relationship between the related projects. Accordingly, an aspect of the method is the determination and selection of the primary relationship. When a single relationship exists between two tasks, work elements or projects, it is, by default, the primary relationship. When multiple activity level logic relationships exist between two tasks, work elements or projects, the system compares the relationships to identify the most restrictive relationship that drives the relative schedule of the two tasks, work elements or projects. The most restrictive relationship trumps all other logic relationships every time the preceding project moves. In various embodiments, the system determines which of the multiple relationships is the most restrictive and selects the most restrictive relationship as the primary relationship. For example, the system determines the primary relationship on the basis of the largest absolute value (i.e., magnitude) of $t_{lag}$ or $t_{offset}$. When duplicative relationships exist, the system optionally processes only one of the duplicates and skips the remaining relationships. When displaying the relationships via the user interface, various embodiments of the system display only the primary project relationship by default. However, users may selectively have the system display other relationships via the user interface.

The determination and selection of the primary relationship may be implemented as an independent step or incorporated into any of several various operations. In some embodiments, the primary relationship selection occurs after calculating $t_{lag}$ for each activity level relationship. For example, the selection of the primary relationship may be an aspect of the relationship classification operation 208. Alternatively, the primary relationship selection occurs after calculating $t_{offset}$ for each activity level relationship. For example, in the precision approach pipeline, the selection of the primary relationship may be an aspect of precision offset calculation operation 222 or successor date calculation operation 224. Similarly, the selection of the primary relationship may be an aspect of the rounding offset calculation operation 234 or the approximation offset calculation operation 244. The selection of the primary relationship may also be implemented as a separate operation between the relationship classification operation 208 and the virtual relationship generation operation 250.

In some embodiments, only the primary relationship is evaluated by the appropriate calculation approach pipeline to further reduce the computations involved. In other embodiments, whether to process only the primary relationship is configurable by the user via the user interface.

FIG. 3A illustrates an example of a planning scenario configuration having a planning horizon beginning 8/1/14 and ending 12/31/15 and a planning unit of calendar months, which results in the planning horizon being divided into seventeen ordinal periods. Ordinal period 1 covers the calendar month of August 2014, which lasts from 8/1/14 to 8/31/14. Ordinal period 2 covers the calendar month of September 2014, which lasts from 9/1/14 to 9/30/14, and so on. For clarity, it is noted that calendar dates in this application are represented in a month/day/year format (mm/dd/yy).

FIG. 3B illustrates an example of a planning scenario configuration having a planning horizon covering 6 quarters beginning 7/1/14 and ending 12/31/15 and a planning unit of calendar quarters, which results in the planning horizon being divided into six ordinal periods. Ordinal period 1 covers the third calendar quarter of 2014, which lasts from 7/1/14 to 9/30/14. Ordinal period 2 covers the fourth calendar quarter of 2014, which lasts from 10/1/14 to 12/31/14, and so on.

FIG. 3C illustrates an example of a planning scenario configuration having a planning horizon covering 3 years, beginning 10/1/13 and ending 9/30/16 and a planning unit of fiscal years running from October to September, which results in the planning horizon being divided into three ordinal periods. Ordinal period 1 covers the first fiscal year, which lasts from 10/1/13 to 9/30/14. Ordinal period 2 covers the second fiscal year, which lasts from 10/1/14 to 9/30/15, and so on.

FIGS. 4A-D illustrate simplified examples of detail project management information at the activity level with different relationships between predecessor and successor activities. In the figures, the detail project management information 400 includes detailed project data for projects 402 encompassing various activities 404, which has been imported into the system. The projects 402 are uniquely identified as Project X and Project Y. Project X represents the predecessor parent project and Project Y represents the successor parent project. Project X includes three activities 404, which are uniquely identified as Activity M, Activity P, and Activity Q. Project Y includes three activities 404, which are uniquely identified as Activity R, Activity S, and Activity T. Activity P represents the predecessor activity and Activity S represents the successor activity.

Each project 402 and each activity 404 has a start date and an end date. However, only the start dates and end dates used in describing the operation of the system are detailed in the figures. Specifically, the figures only show the start dates and end dates for both projects 402, Activity P, and Activity S, detailed relative to the configured planning unit and planning horizon. Further, Project X and Project Y are connected by a logic relationship 406 between Activity P and Activity S, represented by the broken arrows, in the examples. For simplicity, a single logic relationship between the two projects is shown and is presumed to be the primary activity level relationship between the projects, either by virtue of being the only activity level relationship between the projects or being evaluated as being the driving relationship between the projects.

The operation of the system is described in reference to the exemplary scenarios using the representative project management information of FIGS. 4A-D in combination with the planning scenario configurations of FIGS. 3A-C. More specifically, the following operational examples describe the generation of virtual relationships using the precision approach, the rounding approach, and the approximation approach. These examples are illustrative in nature and are not intended to limit the scope of this disclosure.

Figure 4A:
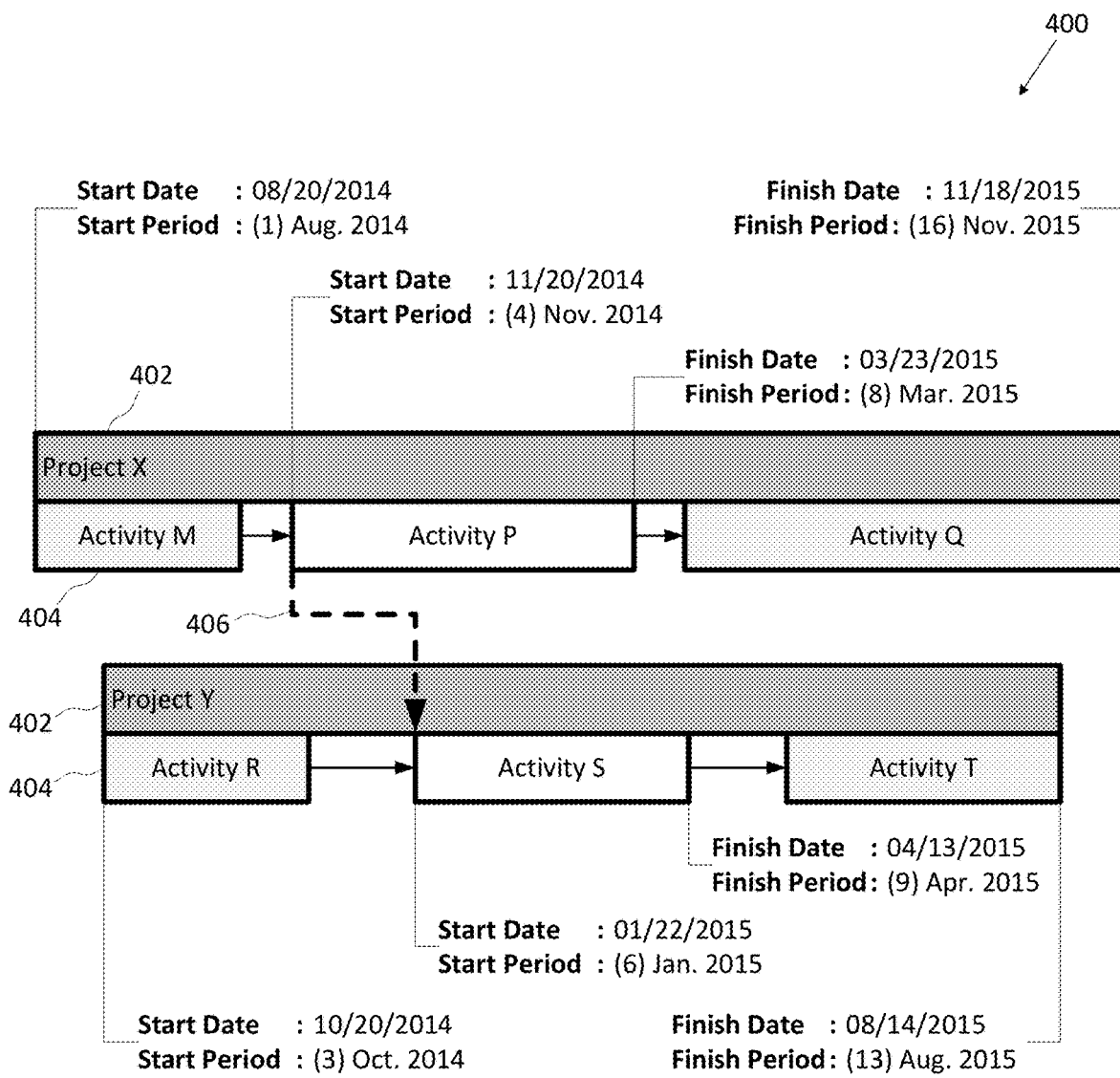
FIGS. 4A-D illustrate simplified examples of detail project management information at the activity level with different relationships between predecessor and successor activities.

FIG. 4A illustrates exemplary detailed project management information annotated based on the monthly planning scenario configuration of FIG. 3A. The logic relationship 406 connecting the predecessor and successor activities is a start-to-start logic relationship. The lag between the start date of Activity P and the start date of Activity S at the activity level is 63 days. In other words, Activity S cannot start any sooner than 63 calendar days after the start date of Activity P.

Example 4A-1

In the first example using the start-to-start monthly planning scenario of FIG. 4A, the offset is calculated using the precision approach pipeline 220. Because the system identifies the activity level relationship as a start-to-start logic relationship, the system uses the corresponding start dates of Project X, $Start_X$, and Project Y, $Start_Y$ as the key dates.

First, the system calculates $t_{lag}$ for Project Y relative to Project X: $t_{lag}$=TDIFF($Start_s$–$Start_p$)=[1/22/15]–[11/20/14] =63 days. Next, the system calculates the offset using $t_{lag}$ and the appropriate key dates for the relationship type using Equation 2, as shown below.

$$t_{offset} = t_{lag} + \{TDIFF(Start_p, Start_X)\} -$$
$$\{TDIFF(Start_s, Start_Y)\} + 0$$
$$= 63 \text{ days} + \{[11/20/14] - [8/20/14]\} -$$
$$\{[1/22/15] - [10/20/14]\}$$
$$= 63 \text{ days} + \{92 \text{ days}\} - \{94 \text{ days}\}$$
$$= 61 \text{ days}$$

Using the calculated offset, the system then calculates the earliest start date for Project Y: Earliest $Start_Y$=$Start_X$+$t_{offset}$= [8/20/14]+61 days=[10/20/14]. Next, the system maps the start date of the Project X and the earliest start date for Project Y to ordinal planning periods, with the results indicated in Table 4A-1 below.

TABLE 4A-1

Dates Mapped to Planning Periods for Example 4A-1

| | Calendar Date | Planning Period (Month/Year) | Planning Period Ordinal Number (N) |
|---|---|---|---|
| $Start_X$ | Aug. 20, 2014 | August 2014 | 1 |
| Earliest $Start_Y$ | Oct. 20, 2014 | October 2014 | 3 |

Finally, the system calculates the offset, $t_{offset}$, in terms of planning periods:

$t_{offset}$=$NStart_X$–$N_{Earliest\ Start_Y}$=3–1=2 months.

The system then uses the offset to generate a start-to-start virtual relationship at the WBS level where the start date of Project Y occurs two months after the start date of Project X.

Example 4A-2

In the second example using the start-to-start monthly planning scenario of FIG. 4A, the offset is calculated using the rounding approach pipeline 230. The system first maps the start dates of Project X, Project Y, Activity P, and Activity S (predecessor and successor projects and activities) to the corresponding ordinal planning periods, with the results indicated in Table 4A-2 below.

TABLE 4A-2

Relevant Dates Mapped to Planning Periods for Example 4A-2

| Key Date | Calendar Date | Planning Period (Month/Year) | Planning Period Ordinal Number (N) |
|---|---|---|---|
| $Start_X$ | Aug. 20, 2014 | August 2014 | 1 |
| $Start_Y$ | Oct. 20, 2014 | October 2014 | 3 |
| $Start_P$ | Nov. 20, 2014 | November 2014 | 4 |
| $Start_S$ | Jan. 22, 2015 | January 2015 | 6 |

Then, the system calculates the offset, $t_{offset}$, in planning period units:

$$t_{offset} = (N_{Start_S} - N_{Start_P}) +$$
$$\{(N_{Start_P} - N_{Start_X}) - (N_{Start_S} - N_{Start_Y})\}$$
$$= (6-4) + \{(4-1) - (6-3)\}$$
$$= (2) + \{(3) - (3)\}$$
$$= 2 \text{ months}$$

The mapping operations and the resulting ordinal value calculations are less computationally intensive than the date difference calculations performed by the system in the precision approach.

Again, the system uses the offset to generate a start-to-start virtual relationship at the WBS level where the start date of Project Y occurs two months after the start date of Project X.

Example 4A-3

In the third example using the start-to-start monthly planning scenario of FIG. 4A, the offset is calculated using the approximation approach pipeline 240. The system first maps the start date of Project X and the start date of Project Y to the corresponding ordinal planning periods, with the results indicated in Table 4A-3 below.

TABLE 4A-3

Relevant Dates Mapped to Planning Periods for Example 4A-3

| Key Date | Calendar Date | Planning Period (Month/Year) | Planning Period Ordinal Number (N) |
|---|---|---|---|
| $Start_X$ | Aug. 20, 2014 | August 2014 | 1 |
| $Start_Y$ | Oct. 20, 2014 | October 2014 | 3 |

Then, the system calculates the offset, $t_{offset}$, in terms of planning periods using the simplified approximation of Equation 4: $t_{offset}$=($N_{Start_Y}$–$N_{Start_X}$)=(3–1)=2 months.

Yet again, the system uses the offset to generate a virtual start-to-start virtual relationship at the WBS level where the start date of Project Y occurs two months after the start date of Project X. For this scenario, the precision approach, the rounding approach, and the approximation approach produce the same result.

Figure 4B:
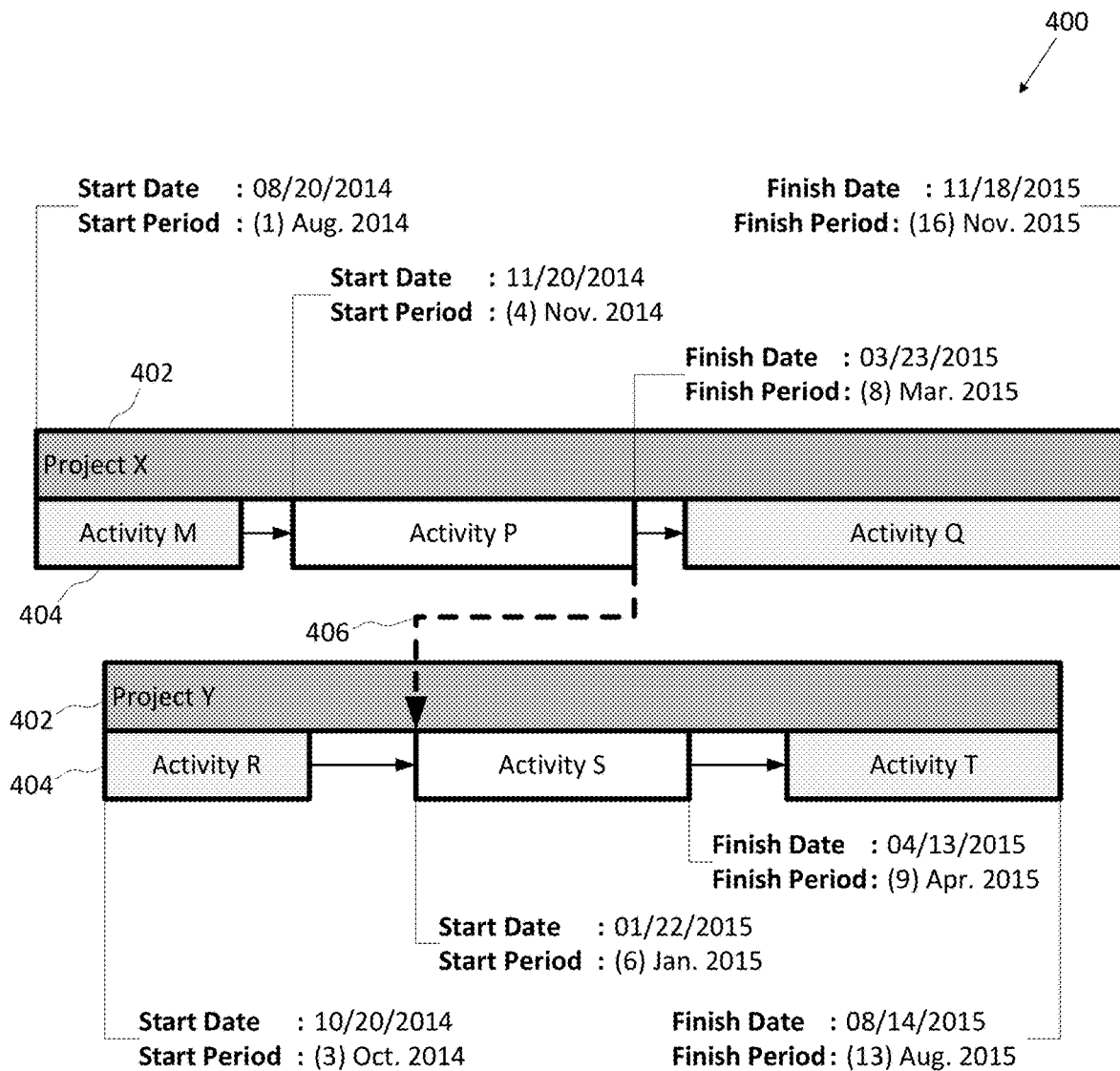

FIG. 4B illustrates exemplary detailed project management information annotated, again based on the planning scenario configuration of FIG. 3A. However, the logic relationship 406 connecting the predecessor and successor activities is a finish-to-start logic relationship. The lag between the finish date of Activity P and the start date of Activity S at the activity level is −61 days (i.e., 61 days lead, counting the end date). In other words, Activity S cannot start any sooner than 61 calendar days before the finish date of Activity P.

Example 4B-1

In the first example using the finish-to-start monthly planning scenario of FIG. 4B, the offset is calculated using the precision approach pipeline 220. Because the activity level relationship is a finish-to-start logic relationship, the key dates are the finish date of Project X (predecessor project), $Finish_X$, and the start date of Project Y (successor project) $Start_Y$.

First, the system calculates $t_{lag}$ for Project Y relative to Project X: $t_{lag}$=TDIFF($Start_s$−$Finish_p$)=[1/22/15]−[3/23/15] =−61 days (counting the end date). Next, the system calculates the offset using the $t_{lag}$ and the appropriate key dates for the relationship type:

$$t_{offset} = t_{lag} + \{TDIFF(Finish_p, Finish_X)\} -$$
$$\{TDIFF(Start_s, Start_Y)\} + 1$$
$$= -61 \text{ days}\{[3/23/15] - [11/18/15]\} -$$
$$\{[1/22/15] - [10/20/14]\} + 1$$
$$= -61 \text{ days} + \{-240 \text{ days}\} - \{94 \text{ days}\} + 1$$
$$= -394 \text{ days}$$

Using the calculated offset, the system then calculates the earliest start date for Project Y: Earliest $Start_Y$=$Finish_X$+ $t_{offset}$=[11/18/15]−394 days=[10/20/14]. Next, the system maps the finish date of the Project X and the earliest start date for Project Y to ordinal planning periods, with the results indicated in Table 4B-1 below.

TABLE 4B-2

Relevant Dates Mapped to Planning Periods for Example 4B-1

|  | Calendar Date | Planning Period (Month/Year) | Planning Period Ordinal Number (N) |
| --- | --- | --- | --- |
| $Finish_X$ | Aug. 20, 2015 | November 2015 | 16 |
| Earliest $Start_Y$ | Oct. 20, 2015 | October 2014 | 3 |

The system calculates the offset, $t_{offset}$, in terms of planning periods: $t_{offset}$=$N_{Earliest\ Start_Y}$−$N_{Finish_X}$=3−16=−13 months. Finally, the adjustment for a finish-to-start relationship is applied to the offset: $t_{offset}$=$t_{offset}$−1=−13−1=−14 months.

The system then uses the offset to generate a virtual finish-to-start relationship at the WBS level where the start date of Project Y occurs 14 months before the finish date of Project X.

Example 4B-2

In the second example using the finish-to-start monthly planning scenario of FIG. 4B, the offset is calculated using the rounding approach pipeline 230. The system first maps the key start and finish dates of Project X, Project Y, Activity P, and Activity S to the corresponding ordinal planning periods, with the results indicated in Table 4B-2 below.

TABLE 4B-2

Relevant Dates Mapped to Planning Periods for Example 4B-2

| Key Date | Calendar Date | Planning Period (Month/Year) | Planning Period Ordinal Number (N) |
| --- | --- | --- | --- |
| $Finish_X$ | Aug. 20, 2014 | November 2015 | 16 |
| $Start_Y$ | Oct. 20, 2014 | October 2014 | 3 |
| $Finish_p$ | Mar. 23, 2015 | March 2015 | 8 |
| $Start_s$ | Jan. 22, 2015 | January 2015 | 6 |

Then, the system calculates the offset, $t_{offset}$) in planning period units:

$$t_{offset} = (N_{Start_s} - N_{Finish_p}) +$$
$$\{(N_{Finish_p} - N_{Finish_X}) - (N_{Start_s} - N_{Start_Y})\}$$
$$= (6 - 8) + \{(8 - 16) - (6 - 3)\}$$
$$= (-2) + \{(-8) - (3)\}$$
$$= -13 \text{ months}$$

Again, the system uses the offset to generate a finish-to-start virtual relationship at the WBS level where the start date of Project Y occurs 13 months before the finish date of Project X. For this scenario, the rounding approach produces a different result from the precision approach.

Example 4B-3

In the third example using the finish-to-start monthly planning scenario of FIG. 4B, the offset is calculated using the approximation approach pipeline 240. The system first maps the finish date of Project X and the start date of Project Y to the corresponding ordinal planning periods, with the results indicated in Table 4B-3 below.

TABLE 4B-3

Relevant Dates Mapped to Planning Periods for Example 4B-3

| Key Date | Calendar Date | Planning Period (Month/Year) | Planning Period Ordinal Number (N) |
| --- | --- | --- | --- |
| $Finish_X$ | Aug. 20, 2014 | November 2015 | 16 |
| $Start_Y$ | Oct. 20, 2014 | October 2014 | 3 |

Then, the system calculates the offset, $t_{offset}$, in terms of planning periods using the simplified approximation of Equation 4: $t_{offset}$=($N_{Start_Y}$−$N_{Finish_X}$)=(3−16)=−13 months.

Yet again, the system uses the offset to generate a virtual finish-to-start relationship at the WBS level where the start date of Project Y occurs 13 months before the finish date of Project X. For this scenario, the rounding and approximation approaches produce a different result from the precision approach.

Figure 4C:
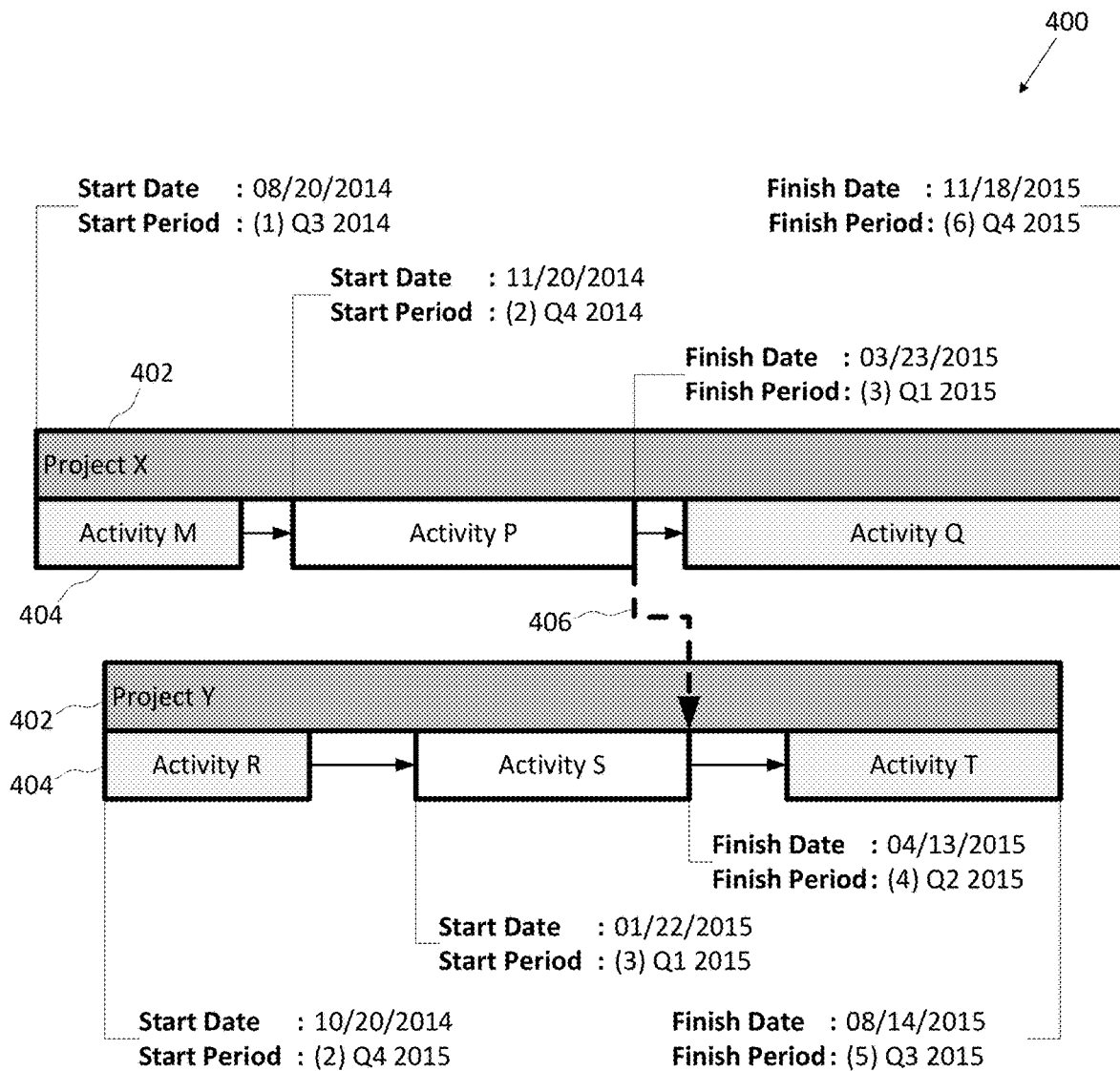

FIG. 4C illustrates exemplary detailed project management information annotated based on the quarterly planning scenario configuration of FIG. 3B. The logic relationship 406 connecting the predecessor and successor activities is a finish-to-finish logic relationship. The lag between the finish date of Activity P and the finish date of Activity S at the activity level is −96 days (i.e., 96 days lead). In other words, Activity S cannot finish any sooner than 96 calendar days after the finish date of Activity P.

Example 4C-1

Example 4C-1 describes the application of the precision approach pipeline 220 to the finish-to-finish quarterly planning scenario of FIG. 4C. Because the activity level relationship is a finish-to-finish logic relationship, the key dates are the finish dates, $Finish_X$ and $Finish_Y$, of the projects.

First, the system calculates $t_{lag}$ for Activity S relative to Activity P: $t_{lag}$=TDIFF($Finish_s$–$Finish_p$)=[4/13/15]–[3/23/15]=21 days. Next, the system calculates the offset using the $t_{lag}$ and the appropriate key dates for the relationship type:

$$t_{offset} = t_{lag} + \{TDIFF(Finish_p, Finish_X)\} - \{TDIFF(Finish_s, Finish_Y)\}$$
$$= 21 \text{ days} + \{[3/23/15] - [11/18/15]\} - \{[4/13/15] - [8/14/15]\}$$
$$= 21 \text{ days} + \{-240 \text{ days}\} - \{-123 \text{ days}\}$$
$$= -96 \text{ days}$$

Using the calculated offset, the system then calculates the earliest finish date for Project Y: Earliest $Finish_Y$=$Finish_X$+$t_{offset}$=[11/18/15]+(–96 days)=[8/14/15]. Next, the system maps the finish date of the Project X and the earliest finish date for Project Y to ordinal planning periods, with the results indicated in Table 4C-1 below.

TABLE 4C-3

Relevant Dates Mapped to Planning Periods for Example 4C-1

| Key Date | Calendar Date | Planning Period (Month/Year) | Planning Period Ordinal Number (N) |
|---|---|---|---|
| $Finish_X$ | Nov. 18, 2015 | Quarter 4, 2015 | 6 |
| Earliest $Finish_Y$ | Aug. 14, 2015 | Quarter 3, 2015 | 5 |

Finally, the system calculates the offset, $t_{offset}$, in terms of planning periods: $t_{offset}$=$N_{Earliest\ Finish_Y}$–$N_{Finish_X}$=5–6=–1 quarter.

The system then uses the offset to generate a finish-to-finish virtual relationship at the WBS level where the finish date of Project Y occurs one quarter before the finish date of Project X.

Example 4C-2

In the second example using the finish-to-finish quarterly planning scenario of FIG. 4C, the offset is calculated using the rounding approach pipeline 230. The system first maps the key start and finish dates of Project X, Project Y, Activity P, and Activity S to the corresponding ordinal planning periods, with the results indicated in Table 4C-2 below.

TABLE 4C-2

Relevant Dates Mapped to Planning Periods for Example 4C-2

| Key Date | Calendar Date | Planning Period (Quarter/Year) | Planning Period Ordinal Number (N) |
|---|---|---|---|
| $Finish_X$ | Nov. 18, 2015 | Q4, 2015 | 6 |
| $Finish_Y$ | Aug. 14, 2015 | Q3, 2015 | 5 |

TABLE 4C-2-continued

Relevant Dates Mapped to Planning Periods for Example 4C-2

| Key Date | Calendar Date | Planning Period (Quarter/Year) | Planning Period Ordinal Number (N) |
|---|---|---|---|
| $Finish_P$ | Mar. 23, 2015 | Q1, 2015 | 3 |
| $Finish_S$ | Apr. 13, 2015 | Q2, 2015 | 3 |

Then, the system calculates the offset, $t_{offset}$, in terms of planning periods:

$$t_{offset} = (N_{Finish_S} - N_{Finish_P}) + \{(N_{Finish_P} - N_{Finish_X}) - (N_{Finish_S} - N_{Finish_Y})\}$$
$$= (3-3) + \{(3-6) - (3-5)\}$$
$$= (0) + \{(-3) - (-2)\}$$
$$= -1 \text{ quarter}$$

Again, the system uses the offset to generate a finish-to-finish virtual relationship at the WBS level where the finish date of Project Y occurs one quarter before the finish date of Project X. For this scenario, the precision approach, the rounding approach, and the approximation approach produce the same result.

Example 4C-3

In the third example using the finish-to-finish quarterly planning scenario of FIG. 4C, the offset is calculated using the approximation approach pipeline 240. The system first maps the finish dates of Project X and Project Y to the corresponding ordinal planning periods, with the results indicated in Table 4C-3 below.

TABLE 4C-3

Relevant Dates Mapped to Planning Periods for Example 4C-3

| Key Date | Calendar Date | Planning Period (Quarter/Year) | Planning Period Ordinal Number (N) |
|---|---|---|---|
| $Finish_X$ | Nov. 18, 2015 | Q4, 2015 | 6 |
| $Finish_Y$ | Aug. 14, 2015 | Q3, 2015 | 5 |

Then, the system calculates the offset, $t_{offset}$, in terms of planning periods using the simplified approximation of Equation 4: $t_{offset}$=($N_{Finish_Y}$–$N_{Finish_X}$)=(5–6)=–1 quarter.

Yet again, the system uses the offset to generate a finish-to-finish virtual relationship at the WBS level where the finish date of Project Y occurs one quarter before the finish date of Project X. For this scenario, the precision approach and the rounding approach produce the same result.

Figure 4D:
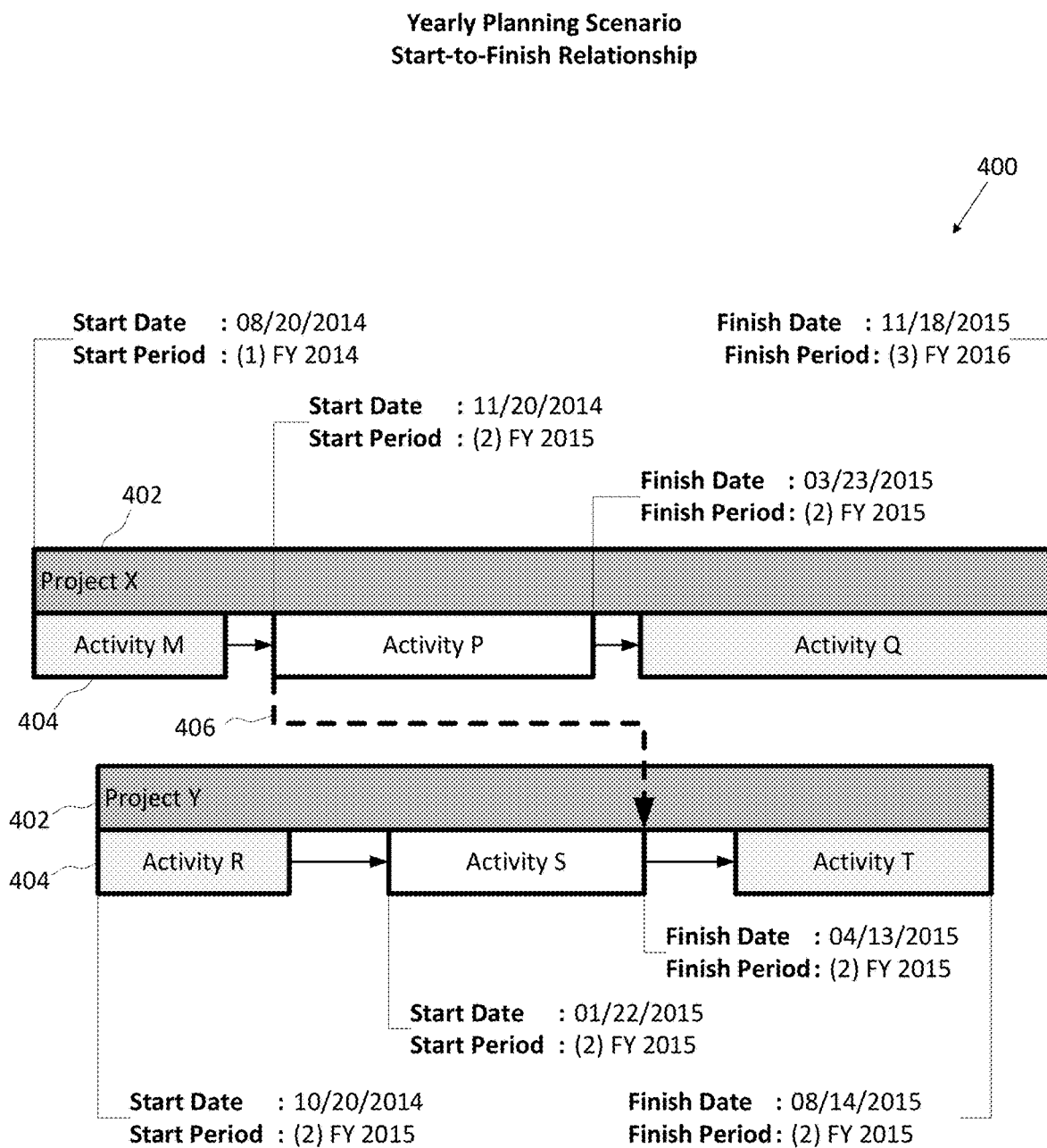

FIG. 4D illustrates exemplary detailed project management information annotated based on the yearly planning scenario configuration of FIG. 3C. The logic relationship 406 connecting the predecessor and successor activities is a start-to-finish logic relationship. The lag between the start date of Activity P and the finish date of Activity S at the activity level is 145 days (counting the end date). In other words, Activity S cannot finish any sooner than 145 calendar days after the start date of Activity P.

Example 4D-1

In the first example using the start-to-finish yearly planning scenario of FIG. 4D, the offset is calculated using the precision approach pipeline 220. Because the activity level relationship is a start-to-finish logic relationship, the key dates are the start date of Project X, $Start_X$, and the finish date of Project Y, $Finish_Y$.

First, the system calculates $t_{lag}$ for Project Y relative to Project X: $t_{lag}$=TDIFF($Finish_s$–$Start_p$)=[4/13/15]–[11/20/14]=145 days (counting the end date). Next, the system calculates the offset using the $t_{lag}$ and the appropriate key dates for the relationship type:

$$t_{offset} = t_{lag} + \{TDIFF(Start_p, Start_X)\} - \\ \{TDIFF(Finish_s, Finish_Y)\} \\ = 145 \text{ days} + \{[11/20/14] - [8/20/14]\} - \\ \{[4/13/15] - [8/14/15]\} - 1 \\ = 145 \text{ days} + \{92 \text{ days}\} - \{-123 \text{ days}\} - 1 \\ = 359 \text{ days}$$

Using the calculated offset, the system then calculates the earliest finish date for Project Y: Earliest $Finish_Y$=$Start_X$+$t_{offset}$=[8/20/14]+359 days=[8/14/15]. Next, the system maps the finish date of the Project X and the earliest start date for Project Y to ordinal planning periods, with the results indicated in Table 4D-1 below.

TABLE 4D-4

Relevant Dates Mapped to Planning Periods for Example 4D-1

|  | Calendar Date | Planning Period (Fiscal Year) | Planning Period Ordinal Number (N) |
|---|---|---|---|
| $Start_X$ | Aug. 20, 2014 | FY 2014 | 1 |
| Earliest $Finish_Y$ | Aug. 14, 2015 | FY 2015 | 2 |

The system calculates the offset, $t_{offset}$, in terms of planning periods: $t_{offset}$=$N_{Earliest\ Finish_Y}$–$N_{Start_X}$=2–1=1 year.

The system then uses the offset to generate a virtual start-to-finish relationship at the WBS level where the finish date of Project Y occurs 1 year after the start date of Project X.

Example 4D-2

In the second example using the start-to-finish yearly planning scenario of FIG. 4D, the offset is calculated using the rounding approach pipeline 230. The system first maps the key start and finish dates of Project X, Project Y, Activity P, and Activity S to the corresponding ordinal planning periods, with the results indicated in Table 4D-2 below.

TABLE 4D-2

Relevant Dates Mapped to Planning Periods for Example 4D-2

| Key Date | Calendar Date | Planning Period (Fiscal Year) | Planning Period Ordinal Number (N) |
|---|---|---|---|
| $Start_X$ | Aug. 20, 2014 | FY 2014 | 1 |
| $Finish_Y$ | Aug. 14, 2015 | FY 2015 | 2 |
| $Start_p$ | Nov. 20, 2014 | FY 2015 | 2 |
| $Finish_s$ | Apr. 13, 2015 | FY 2015 | 2 |

Then, the system calculates the offset, $t_{offset}$, in planning period units:

$$t_{offset} = (N_{Finish_s} - N_{Start_p}) + \\ \{(N_{Start_p} - N_{Start_X}) - (N_{Finish_s} - N_{Finish_Y})\} \\ = (2-2) + \{(2-1) - (2-2)\} \\ = (0) + \{(1) - (0)\} \\ = 1 \text{ year}$$

Again, the system uses the offset to generate a virtual start-to-finish relationship at the WBS level where the finish date of Project Y occurs 1 year after the start date of Project X. For this scenario, the precision approach and the rounding approach produce the same result.

Example 4D-3

In the third example using the start-to-finish yearly planning scenario of FIG. 4D, the offset is calculated using the approximation approach pipeline 240. The system first maps the start date of Project X and the start date of Project Y to the corresponding ordinal planning periods, with the results indicated in Table 4D-3 below.

TABLE 4D-3

Relevant Dates Mapped to Planning Periods for Example 4D-3

| Key Date | Calendar Date | Planning Period (Fiscal Year) | Planning Period Ordinal Number (N) |
|---|---|---|---|
| $Start_X$ | Aug. 20, 2014 | FY 2014 | 1 |
| $Finish_Y$ | Aug. 14, 2015 | FY 2015 | 2 |

Then, the system calculates the offset, $t_{offset}$, in terms of planning periods using the simplified approximation of Equation 4: $t_{offset}$=($N_{Finish_Y}$–$N_{Start_X}$)=(2–1)=1 year.

Again, the system uses the offset to generate a virtual start-to-finish relationship at the WBS level where the finish date of Project Y occurs one year after the start date of Project X. For this scenario, the precision approach, the rounding approach, and the approximation approach produce the same result.

Figure 5:
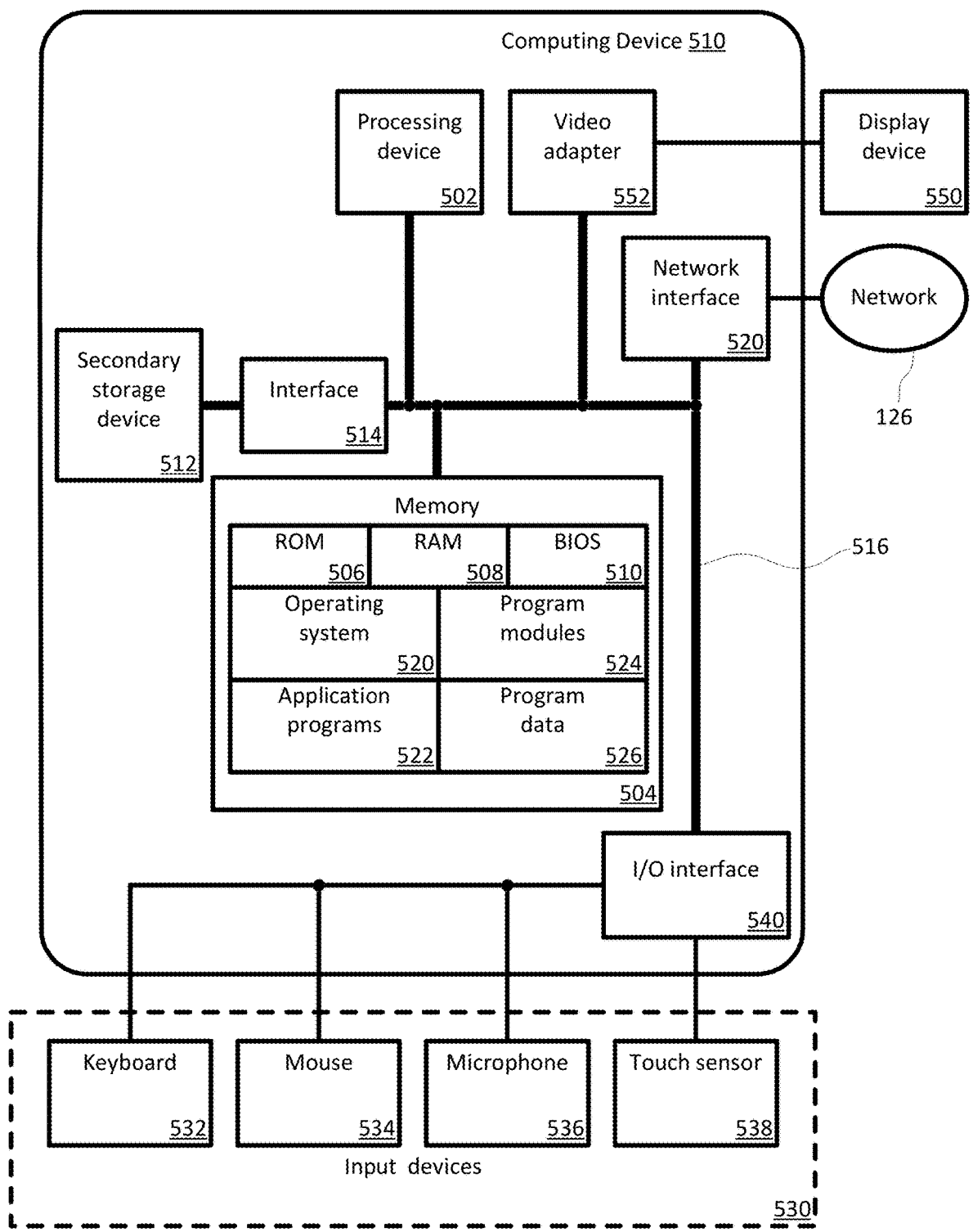
FIG. 5 illustrates an exemplary architecture of a computing device suitable for implementing aspects of the system and method described herein.

FIG. 5 is an exemplary architecture of a computing device suitable for implementing aspects of the present disclosure. The illustrated computing device may be used to execute the operating system, application programs, and software components (including the software engines) described herein. Examples of suitable computing devices include, but are not limited to, servers, personal computers, laptop computers, tablet or surface computers, and smart phones.

The computing device 500 includes, in some embodiments, at least one processing device 502, such as a central processing unit (CPU). A variety of processing devices are available from a variety of manufacturers, for example, Intel® or Advanced Micro Devices®. In this example, the computing device 500 also includes a memory 504, and a system bus 516 that couples various system components including the memory 504 to the processing device 502. The system bus 516 is one of any number of types of bus structures including a memory bus, or memory controller; a peripheral bus; and a local bus using any of a variety of bus architectures.

Examples of computing devices suitable for the computing device 500 include a desktop computer, a laptop computer, a tablet computer, a mobile computing device (such as a smart phone, a tablet device, or other mobile devices), or other devices configured to process digital instructions.

The memory 504 includes read only memory 506 and random access memory 508. A basic input/output system 510 containing the basic routines that act to transfer information within computing device 500, such as during start up, is typically stored in the read only memory 506.

The computing device 500 also includes a secondary storage device 512 in some embodiments, such as a hard disk drive, for storing digital data. The secondary storage device 512 is connected to the system bus 516 by a secondary storage interface 514. The secondary storage device 512 and any associated computer readable media provide nonvolatile storage of computer readable instructions (including application programs and program modules), data structures, and other data for the computing device 500.

Although the exemplary environment described herein employs a hard disk drive as a secondary storage device, other types of computer readable storage media are used in other embodiments. Examples of these other types of computer readable storage media include magnetic cassettes, flash memory cards, digital video disks, Bernoulli cartridges, compact disc read only memories, digital versatile disk read only memories, random access memories, or read only memories. Some embodiments include non-transitory media. Additionally, such computer readable storage media may include local storage or cloud-based storage.

A number of program modules may be stored in secondary storage device 512 or memory 504, including an operating system 520, one or more application programs 522, other program modules 524, and program data 526. The computing device 500 may utilize any suitable operating system, such as Microsoft® Windows®, Google Chrome™, Apple OS, UNIX®, Unix-like operating systems (e.g., Linux), and any other operating system suitable for a computing device. Other examples may include Microsoft, Google, Apple operating systems, or any other suitable operating system used in tablet computing devices.

In some embodiments, a user provides inputs to the computing device 500 through one or more input devices 530. Examples of input devices 530 include a keyboard 532, mouse 534, microphone 536, and touch sensor 538 (such as a touchpad or touch sensitive display). Other embodiments include other input devices 530. The input devices are often connected to the processing device 502 through an input/output interface 540 that is coupled to the system bus 516. These input devices 530 may be connected by any number of input/output interfaces, such as a parallel port, serial port, game port, or a universal serial bus. Wireless communication between input devices and the input/output interface 540 is possible as well, and includes infrared, Bluetooth® wireless technology, 802.11a/b/g/n, cellular, or other radio frequency communication systems in some possible embodiments.

In this example embodiment, a display device 550, such as a monitor, liquid crystal display device, projector, or touch sensitive display device, is also connected to the system bus 516 via an interface, such as a video adapter 552. In addition to the display device 550, the computing device 500 may include various other peripheral devices (not shown), such as speakers or a printer.

When used in a local area networking environment or a wide area networking environment (such as the Internet), the computing device 500 is typically connected to the network 126 through a network interface 554, such as an Ethernet interface. Other possible embodiments use other communication devices. For example, some embodiments of the computing device 500 include a modem for communicating across the network.

The computing device 500 typically includes at least some form of computer readable media. Computer readable media includes any available media that may be accessed by the computing device 500. By way of example, computer readable media include computer readable storage media and computer readable communication media.

Computer readable storage media includes volatile and nonvolatile, removable and non-removable media implemented in any device configured to store information such as computer readable instructions, data structures, program modules, or other data. Computer readable storage media includes, but is not limited to, random access memory, read only memory, electrically erasable programmable read only memory, flash memory or other memory technology, compact disc read only memory, digital versatile disks or other optical storage, magnetic cassettes, magnetic tape, magnetic disk storage or other magnetic storage devices, or any other medium that may be used to store the desired information and that may be accessed by the computing device 500.

The computing device 500 is also an example of programmable electronics, which may include one or more such computing devices, and when multiple computing devices are included, such computing devices may be coupled together with a suitable data communication network so as to collectively perform the various functions, methods, or operations disclosed herein.

The description and illustration of one or more embodiments provided in this application are not intended to limit or restrict the scope of the invention as claimed in any way. The embodiments, examples, and details provided in this application are considered sufficient to convey possession and enable others to make and use the best mode of claimed invention. The claimed invention should not be construed as being limited to any embodiment, example, or detail provided in this application. Regardless of whether shown and described in combination or separately, the various features (both structural and methodological) are intended to be selectively included or omitted to produce an embodiment with a particular set of features. Having been provided with the description and illustration of the present application, one skilled in the art may envision variations, modifications, and alternate embodiments falling within the spirit of the broader aspects of the general inventive concept embodied in this application that do not depart from the broader scope of the claimed invention.

What is claimed is:

1. A system for estimating the effects of changes to project data including a plurality of tasks, work elements or projects having activity-level relationships under selected project planning scenarios, the system comprising:
   a configuration component configured to divide a planning horizon into ordinal planning periods based on a selected planning unit, the planning horizon and the planning unit associated with a selected project planning scenario;
   a logic relationship analyzer identifying a relationship type and an activity level lag for each activity level relationship for generating at least one virtual relationship;
   a virtual offset calculator calculating offsets between key dates of related tasks linked by one of the activity level relationships, the offset being measured in the selected planning unit, and the virtual offset calculator calculating the offsets using a calculation approach selected from a precision approach, a rounding approach, and an approximation approach, wherein the offsets are calculated in the precision approach and the rounding approach based at least in part upon a temporal difference between a plurality of key dates and an associated relationship type identifier, the temporal difference having a direction expressed in terms of a lag time or a lead time as either a negative or a positive value depending upon whether expressed in terms of a lag time or as a lead time;

a virtual relationship generator generating virtual relationships linking one or more related project, sub-project, work breakdown package, parent task or tasks, each virtual relationship having the relationship type corresponding to the activity level relationships determined by the logic relationship analyzer when using the precision approach or the rounding approach and the offset calculated by the virtual offset calculator, wherein the generated virtual relationships are configured to enable evaluation of the key dates of one or more projects, sub-projects, work breakdown packages, parent tasks or tasks;

a scenario analyzer receiving a change to one of the projects, sub-projects, work breakdown packages, parent tasks or tasks and moving any related projects, sub-projects, work breakdown packages, parent tasks or tasks based on the virtual relationships to produce an estimated alternate scenario incorporating the change; and a display unit for showing a visualization of the estimated alternate scenario via a user interface, wherein the virtual offset calculator calculates the offset using the precision approach by calculating an interim offset for a selected pair of related tasks using the lag, calculates an earliest key date of a successor task using the interim offset and the key date of a predecessor project, maps a predecessor task key date and the earliest key date of the successor task to a corresponding ordinal planning period; and calculates the offset for the selected pair of related tasks in planning units using a difference between ordinal numbers of the mapped ordinal planning periods.

2. The system of claim 1, wherein the virtual offset calculator maps the predecessor task key date, the successor task key date, a parent predecessor task key date, and a parent successor task key date to a corresponding ordinal planning period and calculates the offset corresponding to the activity level relationship in planning units using a difference between ordinal numbers of the mapped ordinal planning periods.

3. The system of claim 1, wherein the virtual offset calculator maps the parent predecessor task key date and a parent successor task key date to a corresponding ordinal planning period and calculates the offset corresponding to the activity level relationship in planning units using a difference between ordinal numbers of mapped ordinal planning periods.

4. The system of claim 1, wherein the tasks associated with logic relationships include predecessor activities organized under a first project and successor activities organized under a second project, the logic relationship analyzer selecting a most restrictive relationship between the first project and the second project as a primary relationship.

5. The system of claim 1, wherein the virtual offset calculator includes an end date when calculating the lag if the relationship type is a start-to-finish relationship or a finish-to-start relationship and the lag is measured in days and excludes the end date when calculating the lag if the relationship type is a start-to-start relationship or a finish-to-finish relationship.

\* \* \* \* \*